United States Patent
Cheng et al.

(10) Patent No.: US 8,300,719 B2
(45) Date of Patent: Oct. 30, 2012

(54) APPARATUS FOR DETECTING DIGITAL VIDEO SIGNAL PARAMETERS AND METHOD THEREOF

(75) Inventors: Kai-Wen Cheng, Hsinchu Hsien (TW); Jen-Hsing Wang, Hsinchu Hsien (TW); Ko-Yin Lai, Hsinchu Hsien (TW); Yi-Ying Liao, Hsinchu Hsien (TW); Tai-Lai Tung, Hsinchu Hsien (TW)

(73) Assignee: MStar Semiconductor, Inc. (TW)

( * ) Notice: Subject to any disclaimer, the term of this patent is extended or adjusted under 35 U.S.C. 154(b) by 241 days.

(21) Appl. No.: 12/792,265

(22) Filed: Jun. 2, 2010

(65) Prior Publication Data

US 2011/0002422 A1    Jan. 6, 2011

Related U.S. Application Data

(60) Provisional application No. 61/223,080, filed on Jul. 6, 2009.

(51) Int. Cl.
*H04K 1/10* (2006.01)
(52) U.S. Cl. .......... 375/260; 375/343; 375/344
(58) Field of Classification Search .......... 375/260, 375/344; 370/208, 210; 348/725
See application file for complete search history.

(56) References Cited

U.S. PATENT DOCUMENTS

| | | | |
|---|---|---|---|
| 7,652,980 B2* | 1/2010 | Henriksson et al. | 370/208 |
| 7,787,548 B2* | 8/2010 | Auranen et al. | 375/260 |
| 8,045,628 B2* | 10/2011 | Lahtonen et al. | 375/260 |
| 2004/0228270 A1* | 11/2004 | Chen et al. | 370/210 |
| 2006/0062316 A1* | 3/2006 | Kim | 375/260 |
| 2007/0053448 A1* | 3/2007 | Schwoerer et al. | 375/260 |
| 2010/0220819 A1* | 9/2010 | Li et al. | 375/344 |
| 2010/0309384 A1* | 12/2010 | Asjadi | 348/725 |

* cited by examiner

*Primary Examiner* — David Ometz
*Assistant Examiner* — Fitwi Hailegiorgis
(74) *Attorney, Agent, or Firm* — Andy M. Han; Han IP Law PLLC (57) ABSTRACT

A method for detecting digital video signal parameters detects an integer carrier frequency offset (ICFO), a pilot pattern and a carrier mode of a signal received by an Orthogonal Frequency-Division Multiplexing (OFDM) communication system. The method includes receiving a first OFDM symbol comprising a plurality of first frequency-domain sub-carriers and a second OFDM symbol comprising a plurality of second frequency-domain sub-carriers; generating a plurality of sub-carrier correlation results according to the first frequency-domain sub-carrier and the second frequency-domain sub-carrier; and determining a maximum sub-carrier correlation result from the plurality of sub-carrier correlation results; and outputting an ICFO, a pilot pattern and a carrier mode corresponding to the maximum sub-carrier correlation result.

13 Claims, 5 Drawing Sheets

APPARATUS FOR DETECTING DIGITAL VIDEO SIGNAL PARAMETERS AND METHOD THEREOF

CROSS REFERENCE TO RELATED PATENT APPLICATIONS

This patent application claims priority from Provisional Patent Application No. 61/223,080, filed on Jul. 6, 2009, entitled "Apparatus for Detecting Digital Video Signal Parameters and Method Thereof, which is hereby incorporated in its entirety by reference.

TECHNICAL FIELD

The present disclosure relates to an apparatus and a method for detecting digital video signal parameters and, more particularly, to a digital video signal parameter detecting apparatus and an associated method capable of simultaneously detecting an integer carrier frequency offset (ICFO), a pilot pattern and a carrier mode of a signal received at a receiving end of the digital communication system.

BACKGROUND OF THE PRESENT DISCLOSURE

In a wireless communication system, inter-symbol interference (ISI) between received signals is usually caused by a multi-path fading effect in a radio channel. To remove the ISI, a receiver is provided with an equalizer that needs information of channel impulse response (CIR) to operate, and therefore estimation of the CIR plays a critical part in a mobile radio system. In an Orthogonal Frequency-Division Multiplexing (OFDM) communication system, data symbols may be analyzed according to a predetermined pilot symbol known by a transmitter and a receiver in the estimation of CIR. The pilot symbol is carried by a pilot sub-carrier, and a carrier index of the pilot sub-carrier is compliant to a pilot pattern of a digital signal system specification. For example, in the European Digital Video Broadcasting—Second Generation Terrestrial (DVB-T2) specification, pilot patterns are divided into eight pattern types of PP1, PP2 . . . and PP8 according to different Fast Fourier Transform (FFT) sizes and different guard intervals. Sub-carrier indexes of a same pilot pattern may be different according to different carrier modes. For example, carrier modes of the DVB-T2 specification include a normal carrier mode and an extended carrier mode; the extended carrier mode that applies more frequency-domain sub-carriers than the normal carrier mode is capable of transmitting more data. Therefore, how to accurately detect a pilot pattern and a carrier mode in channel estimation stands as an important subject.

In addition, in a communication system, a mixer up-converts a signal at a transmitting end to a radio frequency (RF) signal that is then transmitted, and the RF signal received at a receiving end via an antenna is down-converted to a baseband signal to be processed. Due to frequency discrepancy between oscillators at the transmitting end and the receiving end, the frequency-reduced signal received at the receiving end has a carrier frequency offset that undesirably affects the accuracy in processing the baseband signal. The carrier frequency offset is a result of an integer carrier frequency offset (ICFO) plus a fractional carrier frequency offset. The ICFO signifies that a frequency offset at the receiving end is an integer multiple of a carrier spacing, and the fractional carrier frequency offset signifies that the frequency offset at the receiving end is a fraction of the carrier spacing. Therefore, an apparatus for detecting a carrier frequency offset is needed to calibrate the frequency-reduced signal of the mixer at the receiving end to an accurate baseband frequency.

In view of the foregoing issues, a digital video signal parameter detecting apparatus capable of simultaneously detecting an ICFO, a pilot pattern and a carrier mode of a received signal at a receiving end is in need to achieve an object of calibrating a frequency at the receiving end and parameters needed for detecting a channel estimation module, as well as reducing chip cost and a signal processing time.

SUMMARY OF THE PRESENT DISCLOSURE

An apparatus, for detecting a digital video signal, receives a first OFDM symbol and a second OFDM symbol to detect an ICFO, a pilot pattern and a carrier mode of a signal received by an OFDM communication system. The first OFDM symbol comprises a plurality of first frequency-domain sub-carriers, and the second OFDM symbol comprises a plurality of second frequency-domain sub-carriers. The apparatus comprises a correlation apparatus, for generating a plurality of sub-carrier correlation results according to the plurality of first frequency-domain sub-carriers and the plurality of second frequency-domain sub-carriers; a maximum value searching unit, coupled to the correlation apparatus, for determining a maximum sub-carrier correlation result from the plurality of sub-carrier correlation results; and a parameter generator, coupled to the maximum value searching unit, for generating the ICFO, the pilot pattern and the carrier mode according to the maximum sub-carrier correlation result.

A method, for detecting digital video signal parameters, is for detecting an ICFO, a pilot pattern and a carrier mode of a signal received by an OFDM communication system. The method comprises receiving a first OFDM symbol comprising a plurality of first frequency-domain sub-carriers and a second OFDM symbol comprising a plurality of second frequency-domain sub-carriers; generating a plurality of sub-carrier correlation results according to the plurality of first frequency-domain sub-carriers and the plurality of second frequency-domain sub-carriers; determining a maximum sub-carrier correlation result from the plurality of sub-carrier correlation results; and outputting the ICFO, the pilot pattern and the carrier mode corresponding to the maximum sub-carrier correlation result.

BRIEF DESCRIPTION OF THE DRAWINGS

Following description and figures are disclosed to gain a better understanding of the advantages of the present disclosure.

DETAILED DESCRIPTION OF THE PREFERRED EMBODIMENT

Figure 1A:
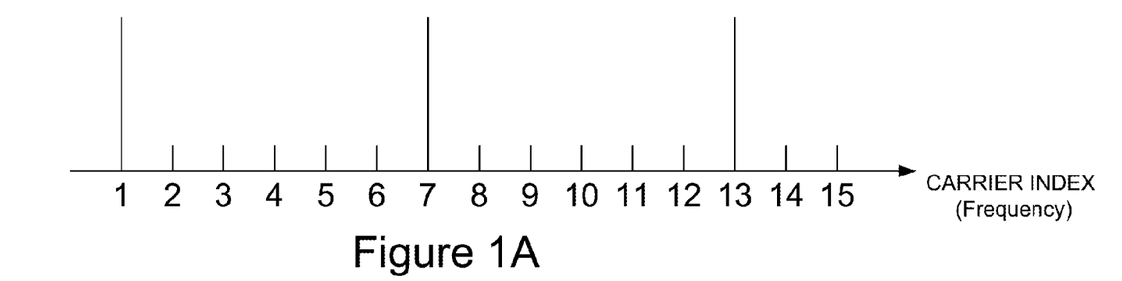
FIG. 1A is a schematic diagram of a relationship between sub-carriers and the frequency of an OFDM signal at a transmitting end.
Figure 1B:
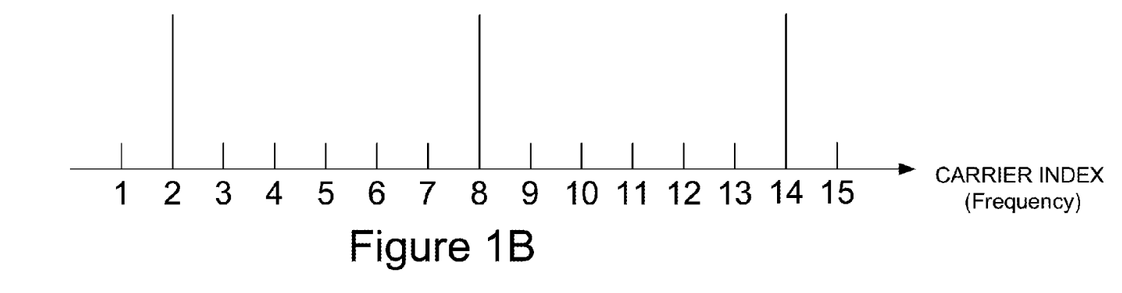
FIG. 1B is a schematic diagram illustrating the OFDM signal in FIG. 1A having an ICFO.
Figure 1C:
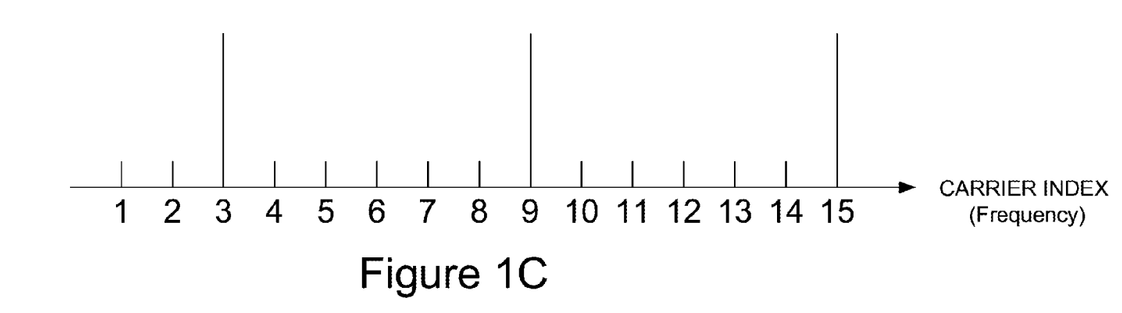
FIG. 1C is a schematic diagram illustrating the OFDM signal in FIG. 1A having an ICFO.

FIG. 1A is a schematic diagram of a relationship between sub-carriers and the frequency of an OFDM signal not yet up-converted at a transmitting end. The sub-carriers have a fixed carrier interval, and sub-carriers corresponding to carrier indexes 1, 7, and 13 are pilot sub-carriers with known signal data for channel estimation. FIG. 1B is a schematic diagram of the signal in FIG. 1A with an integer carrier frequency offset (ICFO). In FIG. 1B, the pilot sub-carriers correspond to carrier indexes 2, 8 and 14, which means it shifts by one carrier interval from the signal shown in FIG. 1A. The shifted pilot sub-carrier indexes are equal to the original carrier indexes added with the ICFO, meaning that the ICFO is one carrier interval. FIG. 1C is a schematic diagram of the signal in FIG. 1A having an ICFO. In FIG. 1C, the pilot sub-carriers correspond to carrier indexes 3, 9 and 15, meaning that the ICFO is two carrier intervals. A method for detecting integer carrier frequency offset (ICFO) implements a characteristic that carrier indexes of pilot sub-carriers are known to obtain the ICFO from differences between pilot sub-carrier indexes of a down-converted signal at a receiving end and the original known carrier indexes.

Figure 2:
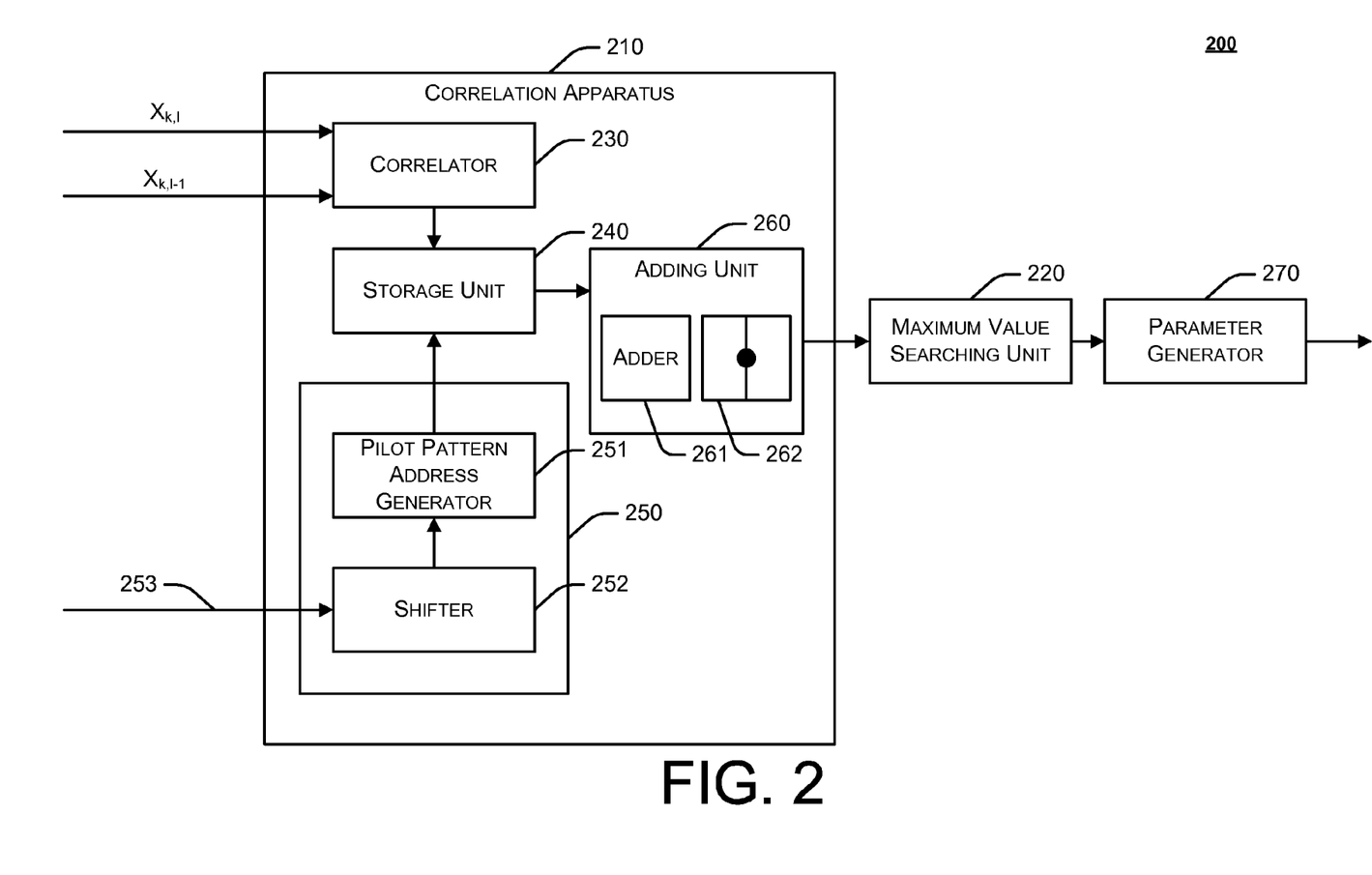
FIG. 2 is a block diagram of an apparatus for detecting digital video signal parameters in accordance with an embodiment of the present disclosure.

FIG. 2 is a block diagram of an apparatus 200 for detecting digital video signal parameters in accordance with an embodiment of the present disclosure. The apparatus 200 receives a plurality of OFDM symbols. Each of the OFDM symbols comprises a plurality of frequency-domain sub-carriers, and the number and interval of the sub-carriers are associated with a Fast Fourier Transform (FFT) size, a guard interval, and a carrier mode. The apparatus 200 detects integer carrier frequency offset (ICFO), a pilot pattern and a carrier mode according to the plurality of OFDM symbols. The apparatus 200 comprises a correlation apparatus 210, a maximum value searching unit 220, and a parameter generator 270. The correlation apparatus 210 estimates a correlation between two OFDM symbols, and generates sub-carrier correlation results according to a plurality of predetermined ICFOs, a predetermined pilot pattern and a predetermined carrier mode. The maximum value searching unit 220 determines the maximum value among the sub-carrier correlation results. The sub-carrier correlation results correspond to different predetermined ICFOs, different predetermined pilot patterns and different predetermined carrier modes. The corresponding predetermined ICFO, the corresponding predetermined pilot pattern and the corresponding predetermined carrier mode of the maximum sub-carrier correlation result are the ICFO at a receiving end, the pilot pattern and the carrier mode of a received OFDM signal at the same receiving end. According to the ICFO, the pilot pattern and the carrier mode corresponding to the maximum sub-carrier correlation result, the parameter generator 270 calibrates frequency offset between the receiving end and a transmitting end by outputting the ICFO to a mixer at the receiving end. The pilot pattern and the carrier mode are output to a channel estimation module to provide accurate pilot symbols and corresponding carrier indexes to retrieve information carried by data sub-carriers.

Referring to FIG. 2, the correlation apparatus 210 comprises a correlator 230, a storage unit 240, an address generating unit 250 and an adding unit 260. The correlator 230 correlates frequency-domain sub-carriers corresponding to carriers indexes of two OFDM symbols. In this embodiment, two successive OFDM symbols are applied to generate correlation values corresponding to carries indexes. In this embodiment, correlation values generated by a complex-conjugate multiplication of the two successive OFDM symbols are represented as $x_{k,l}x^*_{k,l-1}$, where x represents a sub-carrier of an OFDM symbol, k represents a frequency-domain sub-carrier index, and l represents a time-domain OFDM symbol index.

Referring to FIG. 2, the storage unit 240 for storing the correlation values may be an external dynamic random access memory (DRAM) or an internal static random access memory (SRAM). The address generating unit 250 generates sub-carrier addresses corresponding to a pilot pattern and a carrier mode with ICFO effect taken into consideration. The address generating unit 250 comprises a pilot pattern address generator 251 and a shifter 252. The pilot pattern address generator 251 generates sub-carrier addresses according to a predetermined pilot pattern and a predetermined carrier mode, which are associated with a Fast Fourier Transform size and a guard interval. Under different carrier modes, a same pilot pattern may have carrier indexes with different initial points. For example, according to the European DVB-T2 standard, carrier modes include a normal carrier mode and an extended carrier mode. The pilot pattern address generator 251 obtains information of the FFT size and the guard interval of the OFDM communication system to select a corresponding pilot pattern and carrier mode. For example, when the embodiment is applied to the DVB-T2 specification, the pilot patterns include a scatter pilot pattern and a continual pilot pattern. The indexes corresponding to the scatter pilot pattern of OFDM symbols have a regular offset while the indexes of successive pilot pattern are the same, and the successive pilot patterns are taken as an example in the description below. The shifter 252 generates a predetermined ICFO using a carrier interval as a unit, so that a sub-carrier address $k_{select}$ generated by the pilot pattern generator 251 has an offset that is an integer multiple of the carrier interval. The sub-carrier address $k_{select}$ is represented by $k_{pilot}+i$, where $k_{pilot}$ is pilot pattern address, and i is predetermined ICFO having a user-defined range. For example, when the predetermined ICFO is not greater than 8 carrier intervals, i can be equal to −8, −7, ..., −1, 0, 1, ..., 7, or 8. The address generating unit 250 outputs the corresponding sub-carrier addresses according to the predetermined pilot pattern, the predetermined carrier mode and the predetermined ICFO, so as to output correlation values corresponding to the sub-carrier addresses from the storage unit 240 to the adding unit 260. Accordingly, an adder 261 of the adding unit 260 outputs summation of the correlation values, and then absolute value of the summation is obtained by an absolute value unit 262. Therefore, the absolute value is calculated as:

$$\left| \sum_{k \in \{k_{select}\}} x_{k,l} x^*_{k,l-1} \right|$$

Accordingly, a sub-carrier correlation result is generated and outputted to the maximum value searching unit 220. The maximum value searching unit 220 then determines the maximum value of sub-carrier correlation results. After that, the parameter generator 270 outputs a predetermined ICFO, a predetermined pilot pattern and a predetermined carrier mode corresponding to the maximum sub-carrier correlation result to obtain an ICFO, a pilot pattern, and a carrier mode of a signal received at the receiving end of the OFDM communication system.

Table 1 shows pilot patterns of a single-in-single-out (SISO) DVB-T2 communication system. Table 2 shows pilot patterns of a multiple-in-single-out (MISO) DVB-T2 communication system.

TABLE 1

| FFT Size | Guard Interval | | | | | | |
|---|---|---|---|---|---|---|---|
| | 1/128 | 1/32 | 1/16 | 19/256 | 1/8 | 19/128 | 1/4 |
| 32K | PP7 | PP4 PP6 | PP2 PP8 PP4 | PP2 PP8 PP4 | PP2 PP8 | PP2 PP8 | — |
| 16K | PP7 | PP7 PP4 PP6 | PP2 PP8 PP4 | PP2 PP8 PP4 PP5 | PP2 PP3 PP8 | PP PP3 PP8 | PP1 PP8 |
| 8K | PP7 | PP7 PP4 | PP8 PP4 PP5 | PP8 PP4 PP5 | PP2 PP3 PP8 | PP2 PP3 PP8 | PP1 PP8 |
| 4K, 2K | — | PP7 PP4 | PP4 PP5 | — | PP2 PP3 | — | PP1 |
| 1K | — | NA | PP4 PP5 | — | PP2 PP3 | — | PP1 |

TABLE 2

| FFT Size | Guard Interval | | | | | | |
|---|---|---|---|---|---|---|---|
| | 1/128 | 1/32 | 1/16 | 19/256 | 1/8 | 19/128 | 1/4 |
| 32K | PP8 PP4 PP6 | PP8 PP4 | PP2 PP8 | PP2 PP8 | — | — | — |
| 16K | PP8 PP4 PP5 | PP8 PP4 PP5 | PP3 PP8 | PP3 PP8 | PP1 PP8 | PP1 PP8 | — |
| 8K | PP8 PP4 PP5 | PP8 PP4 PP5 | PP3 PP8 | PP3 PP8 | PP1 PP8 | PP1 PP8 | — |
| 4K, 2K | — | PP4 PP5 | PP3 | — | PP1 | — | — |
| 1K | — | — | PP3 | — | PP1 | — | — |

In the DVB-T2 standard, PP1 to PP8 represent eight types of different pilot patterns, and according to Table 1 and Table 2, the address generating unit 250 may select a predetermined pilot pattern according to a plurality of possible pilot patterns corresponding to the FFT size and guard interval of the OFDM communication system. Further, there are at most four types of the possible pilot patterns corresponding to one FFT size and one guard interval of the OFDM communication system. Preferably, the correlation apparatus 210 may correlate four groups of pilot pattern addresses to reduce time for correlating the pilot patterns and time for determining a maximum sub-carrier correlation result by the maximum value searching unit 220.

In the DVB-T2 standard, sub-carriers applied to the FFT sizes 8K, 16K, and 32K are operative in a normal carrier mode and an extended carrier mode, and other sub-carriers of other FFT sizes are operative in the normal carrier mode. Therefore, when the FFT sizes are 8K, 16K and 32K, the address generating unit 250 can select either the normal carrier mode or the extended carrier mode; for other FFT sizes, the address generating unit 250 generates sub-carrier addresses corresponding to the normal carrier mode, so as to reduce time and calculation for correlation performed by the correlation apparatus and for determining a maximum value by the maximum value searching unit 220.

Figure 3:
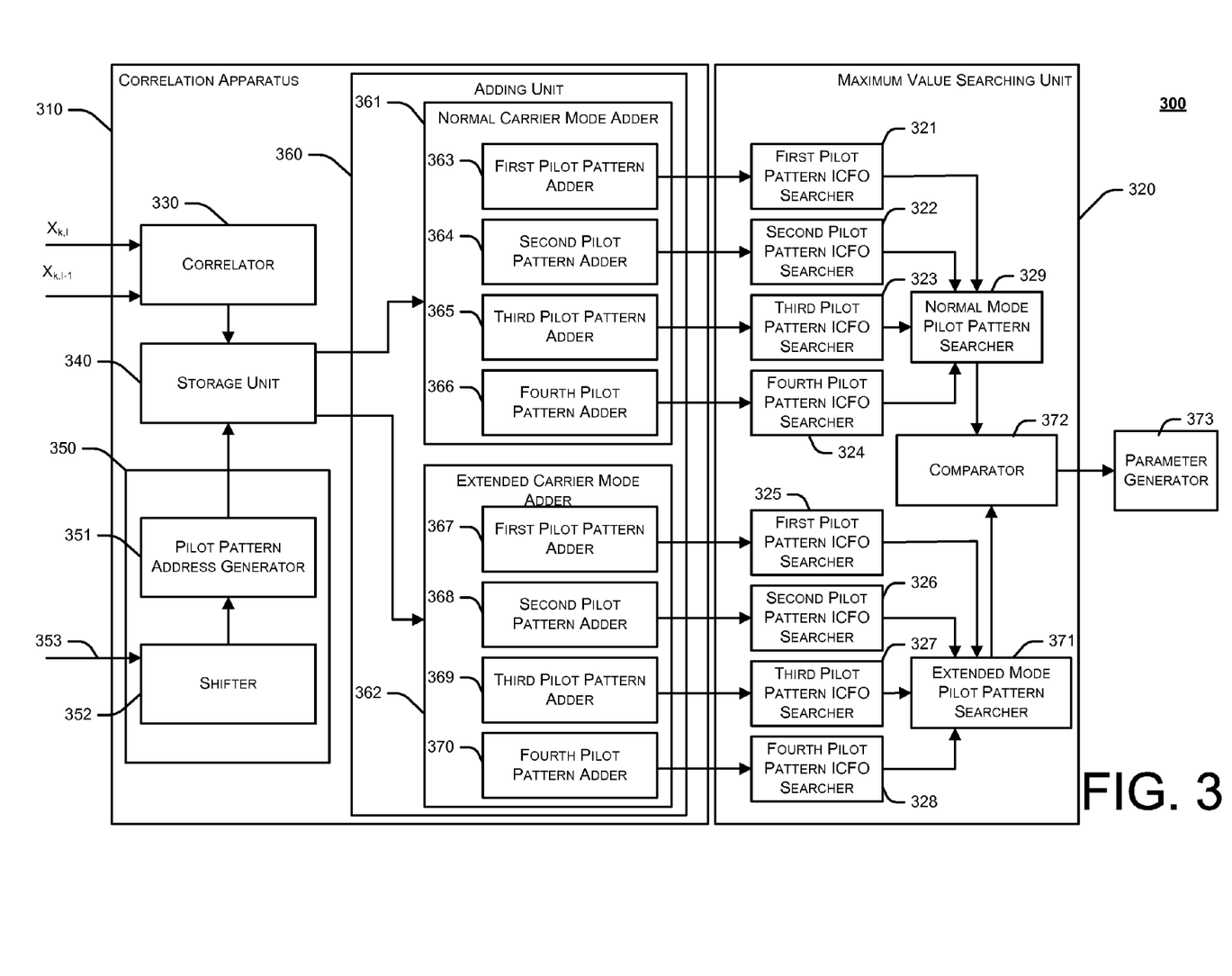
FIG. 3 is a block diagram of an apparatus for detecting digital video signal parameters in accordance with an embodiment of the present disclosure.

FIG. 3 shows a block diagram of an apparatus 300 for detecting digital video signal parameters in accordance with another embodiment of the present disclosure. The apparatus 300 comprises a correlation apparatus 310 and a maximum value searching unit 320. The correlation apparatus 310 comprises a correlator 330, a storage unit 340, an address generating unit 350 and an adding unit 360. The correlator 330 calculates and stores sub-carrier correlation values of two OFDM symbols into the storage unit 340. A pilot pattern address generator 351 of the address generating unit 350 obtains information of the FFT size and guard interval of an OFDM communication system via a signal 353 to select the predetermined pilot pattern and the predetermined carrier mode corresponding to the FFT size and guard interval. The pilot pattern address generator 351 generates and outputs corresponding sub-carrier addresses to the storage unit 340 according to the predetermined pilot pattern, the predetermined carrier mode, and a plurality of predetermined ICFOs. The adding unit 360 has a normal carrier mode adder 361 and an extended carrier mode adder 362, which respectively do the addition at the same time to reduce signal processing time. The normal carrier mode adder 361 adds up correlation values corresponding to sub-carrier addresses of the normal carrier mode selected by the address generating unit 350 to generate a summation, and then obtains an absolute value of the summation. The extended carrier mode adder 362 adds up correlation values corresponding to sub-carrier addresses of the extended carrier mode selected by the address generating unit 350 to a total, and then obtains an absolute value of the total. The normal carrier mode adder 361 comprises a first pilot pattern adder 363, a second pilot pattern adder 364, a third pilot pattern adder 365, and a fourth pilot pattern adder 366, for operating the address generating unit 350 in the normal carrier mode and respectively adding up correlation values of the sub-carriers of a first pilot pattern, a second pilot pattern, a third pilot pattern and a fourth pattern to a total, so as to obtain absolute values of the totals to generate sub-carrier correlation results. The extended carrier mode adder 362 also comprises a first pilot pattern adder 367, a second pilot pattern adder 368, a third pilot pattern adder 369 and a fourth pilot pattern adder 370, for operating the address generating unit 350 in the extended carrier mode and respectively adding up correlation values of the sub-carriers of a first pilot pattern, a second pilot pattern, a third pilot pattern and a fourth pattern to a total, so as to obtain absolute values of the totals to generate a plurality of sub-carrier correlation results. The maximum value searching unit 320 comprises first pilot pattern ICFO searchers 321 and 325, second pilot pattern ICFO searchers 322 and 326, third pilot pattern ICFO searchers 323 and 327, fourth pilot pattern ICFO searches 324 and 328, a normal carrier pilot pattern searcher 329, an extended carrier pattern searcher 371, and a comparator 372. In the DVB-T2 specification, there are at most four types of pilot patterns corresponding to each FFT size and guard interval. In FIG. 3, four types of plot pattern adders and four types of pilot pattern ICFO searchers are taken as an example. Three types of pilot patterns—a first pilot pattern, a second pilot pattern and a third pilot pattern of the OFDM communication system, and two carrier modes—a normal carrier mode and an extended carrier mode of the OFDM communication system, are described below for illustration purposes. The sub-carrier correlation results generated by the first pilot pattern adder 363 are outputted to the first pilot pattern ICFO searcher 321, which determines a maximum value from the sub-carries results corresponding to different ICFOs, so as to obtain a maximum sub-carrier correlation result of a first pilot pattern in the normal carrier mode. Likewise, the sub-carrier correlation results generated by the second pilot pattern adder 364 and the third pilot pattern adder 365 are respectively outputted to the second pilot pattern ICFO searcher 322 and the third pilot pattern ICFO searcher 323, so that maximum sub-carrier correlation results of the second pilot pattern and the third pilot pattern in the normal carrier mode are respectively obtained. The normal carrier pilot pattern searcher 329 determines a maximum value from the maximum sub-carrier correlation results respectively outputted by the first pilot pattern ICFO searcher 321, the second pilot pattern ICFO searcher 322 and the third pixel pattern ICFO searcher 323 to output the obtained maximum sub-carrier correlation result to the comparator 372. The sub-carrier correlation results generated by the first pilot pattern adder 367, the second pilot pattern adder 368, the third pilot pattern adder 369 of the extended carrier mode adder 362 are respectively outputted to the first pilot pattern ICFO searcher 325, the second pilot pattern ICFO searcher 326 and the third pilot pattern ICFO searcher 327, so as to respectively obtain a maximum sub-carrier correlation result of the first pilot pattern, the second pilot pattern and the third pilot pattern in the extended carrier mode. The extended carrier pilot pattern searcher 371 determines a maximum value from the maximum sub-carrier correlation results searched by the first pilot pattern ICFO searcher 325, the second pilot pattern ICFO searcher 326, and the third pilot pattern ICFO searcher 327, and outputs the maximum value to the comparator 372. The comparator 372 selects and outputs the one with larger value between the two maximum sub-carrier correlation results generated by the normal carrier pilot pattern searcher 329 and the extended carrier pilot pattern searcher 371 to a parameter generator 373, which outputs a carrier mode, a pilot pattern and an ICFO corresponding to the selected maximum sub-carrier correlation result, i.e., the carrier mode, the pilot pattern and the ICFO are those of the OFDM signal 353 received by the apparatus 300.

Figure 4A:
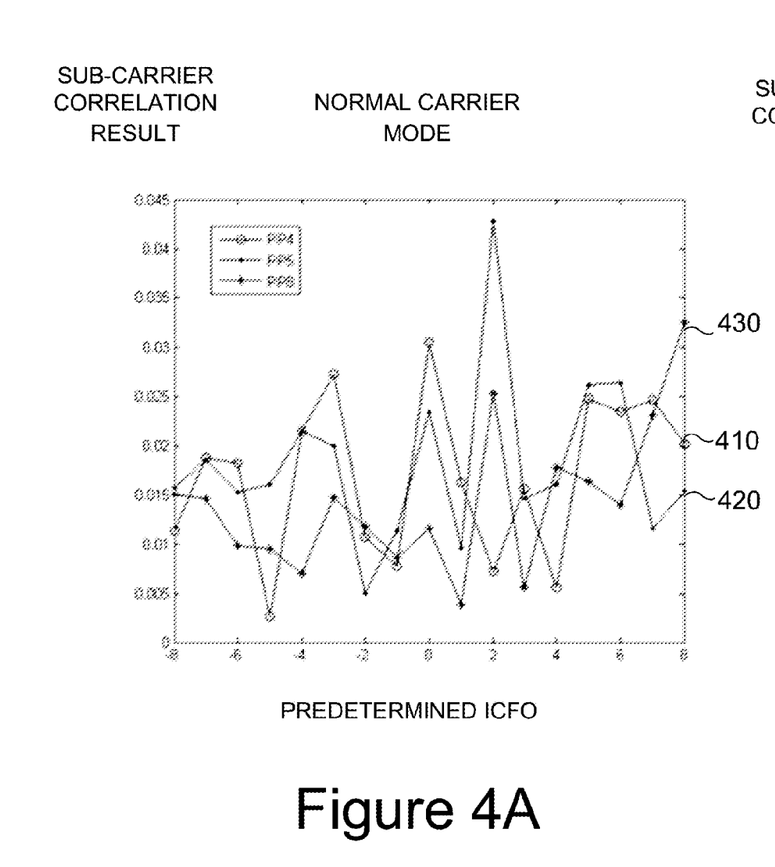
FIG. 4A is a schematic diagram of a sub-carrier correlation result in a normal carrier mode in accordance with an embodiment of the present disclosure.
Figure 4B:
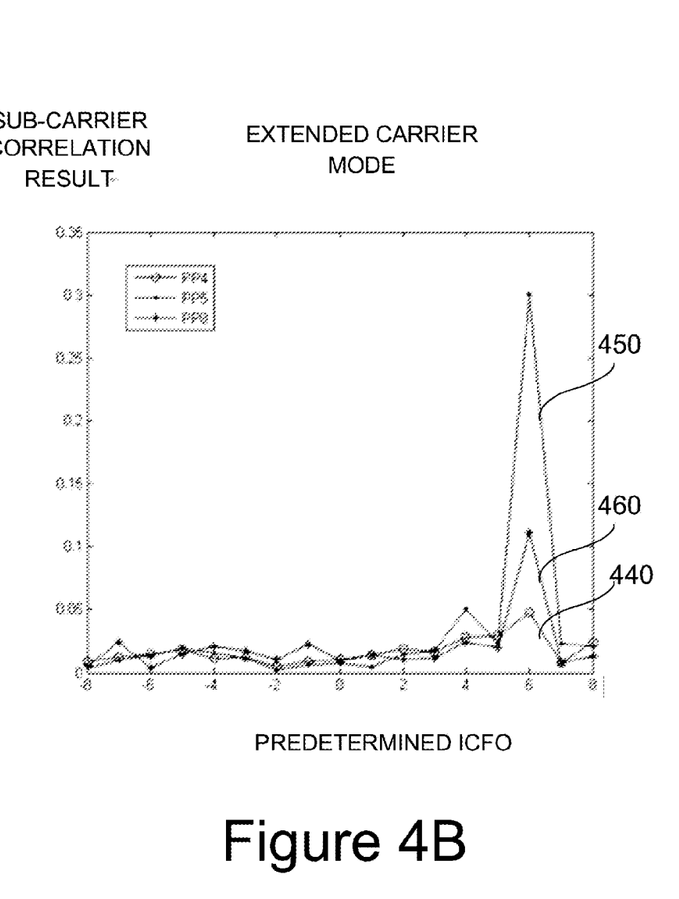
FIG. 4B is a schematic diagram of a sub-carrier correlation result in an extended carrier mode in accordance with an embodiment of the present disclosure.

FIG. 4A is a schematic diagram of a sub-carrier correlation result of a normal carrier mode in accordance with an embodiment of the present disclosure. FIG. 4B is a schematic diagram of a sub-carrier correlation result of an extended carrier mode in accordance with an embodiment of the present disclosure. The horizontal axis in FIG. 4A and FIG. 4B represents a predetermined ICFO, and the vertical axis represents a sub-carrier correlation result. A signal received by a system corresponds to a FFT size of 8K and a guard interval of 19/256, and the system is SISO. Referring to Table 1, it is observed that the received signal has three types of pilot patterns of PP4, PP5 and PP8. In FIG. 4A, Curves 410, 420 and 430 illustrate relationships between the predetermined ICFO and sub-carrier correlation results when the pilot patterns are PP4, PP5 and PP8 in the normal carrier mode. Curves 440, 450 and 460 in FIG. 4B illustrate relationships between the predetermined ICFO and sub-carrier correlation results when the pilot patterns are PP4, PP5 and PP8 in the extended carrier mode. According to sub-carrier correlation results of the curves 410 to 416, it is observed that the maximum sub-carrier correlation result is the correlation result in the curve 450 when the ICFO is equal to 6. As a result, it is determined that the ICFO of the received signal is 6, the pilot pattern is PP5, and the carrier mode is the extended carrier mode.

Figure 5:
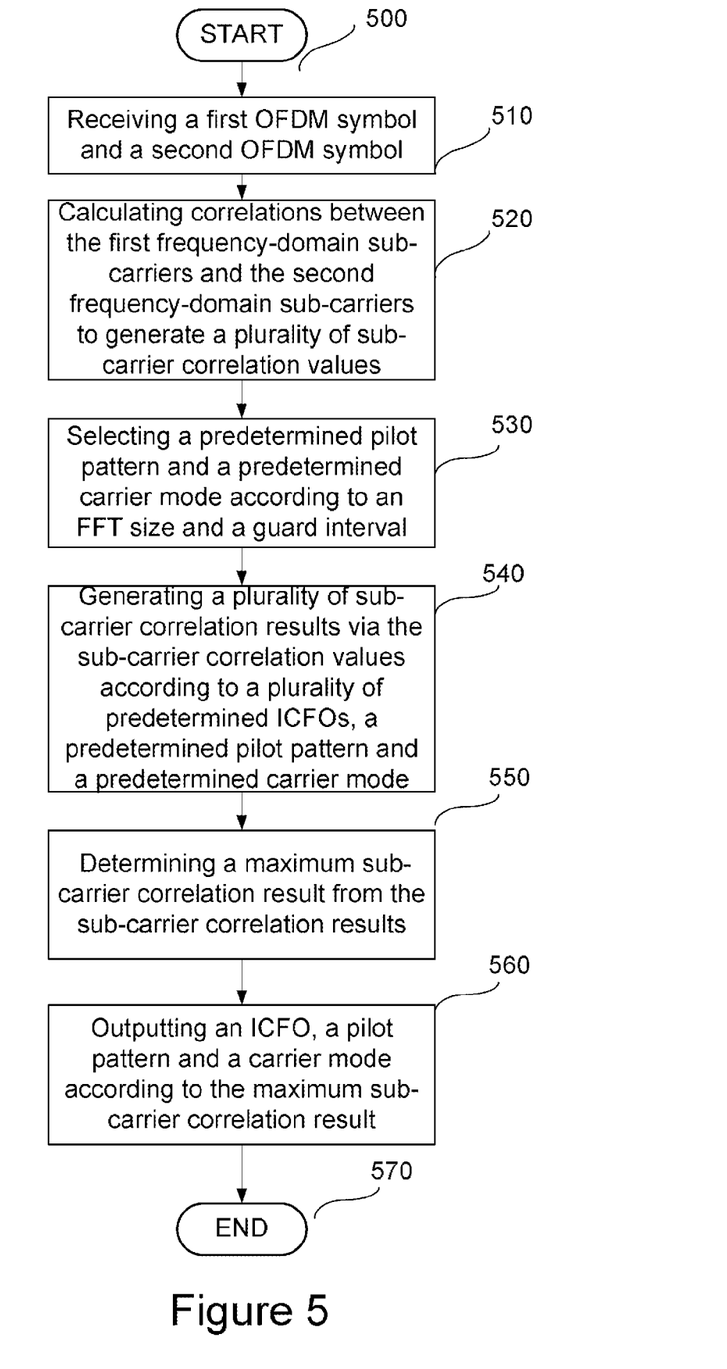
FIG. 5 is a flow chart of a method for detecting digital video signal parameters in accordance with an embodiment of the present disclosure.

FIG. 5 shows a flow chart of a method for detecting digital video signal parameters in accordance with an embodiment of the present disclosure. The method is for detecting an ICFO, a pilot pattern and a carrier mode of a signal received at a receiving end of an Orthogonal Frequency-Division Multiplexing (OFDM) communication system. The method begins with Step 500. Step 510 includes receiving a first OFDM symbol and a second OFDM symbol. The first OFDM symbol comprises a plurality of first frequency-domain sub-carriers, and the second OFDM symbol comprises a plurality of second frequency sub-carriers. In this embodiment, the first OFDM symbol and the second OFDM symbol are successive. In Step 520, it proceeds to calculate correlations between the first frequency-domain sub-carriers and the second frequency-domain sub-carriers to generate a plurality of sub-carrier correlation values. In this embodiment, the correlations are calculated by complex-conjugate multiplying first frequency-domain sub-carriers $x_{k,l}$ by second frequency-domain sub-carriers $x_{k,l-1}$, i.e., the sub-carrier correlation values are $x_{k,l}x^*_{k,l-1}$, where x represents a sub-carrier of each of the OFDM symbols, k represents a frequency-domain sub-carrier index, and l represents a time-domain OFDM symbol index. Step 530 includes selecting a predetermined pilot pattern and a predetermined carrier mode according to an FFT size and a guard interval. For example, in a DVB-T2 system, according to possible corresponding pilot patterns of the FFT sizes and guard intervals in Table 1 and Table 2, it is determined that the carrier mode is a normal carrier mode or an extended carrier mode when the FFT sizes are 8K, 16K and 32K; for other FFT sizes, the carrier mode is the normal carrier mode. Step 540 includes generating a plurality of sub-carrier correlation results via the sub-carrier correlation values according to a plurality of predetermined ICFOs, a predetermined pilot pattern and a predetermined carrier mode. For example, a sub-carrier correlation result is an absolute value, or a square of the absolute value, of a sum of sub-carrier correlation values corresponding to each of the predetermined ICFOs, the predetermined pilot pattern, and the predetermined carrier mode. Predetermined ICFO ranges may be user-defined, e.g., when an ICFO at the receiving end is smaller than 8 carrier intervals, seventeen ICFOs range from $-8, -7, \ldots, -1, 0, 1, \ldots, 7,$ to 8 can be selected. Each of the sub-carrier correlation result corresponds to one predetermined ICFO, one predetermined pilot pattern and one predetermined carrier mode. Step 550 includes determining a maximum sub-carrier correlation result from the sub-carrier correlation results. In Step 560, it includes outputting an ICFO, a pilot pattern and a carrier mode according to the maximum sub-carrier correlation result. The flow ends in Step 570. The ICFO corresponding to the maximum sub-carrier correlation result is determined as ICFO at the receiving end of the OFDM communication system, and the corresponding pilot pattern and the corresponding carrier mode are determined as those of the received signal.

In conclusion, according to the present disclosure, an apparatus for detecting digital video signal parameters receives a first OFDM symbol and a second OFDM symbol to detect an ICFO, a pilot pattern and a carrier mode of a signal received by an OFDM communication system. The first OFDM symbol comprises a plurality of frequency-domain sub-carriers, and the second OFDM symbol comprises a plurality of second frequency-domain sub-carriers. The apparatus for detecting digital video signal parameters comprises a correlation apparatus, for generating a plurality of sub-carrier correlation results according to the plurality of first frequency-domain sub-carriers and the plurality of second frequency-domain sub-carriers; a maximum value searching unit, coupled to the correlation apparatus, for determining a maximum value from the plurality of sub-carrier results; and a parameter generator, coupled to the maximum value searching unit, for generating the ICFO, the pilot pattern and the carrier mode according to the maximum sub-carrier correlation results.

According to the present, a method for detecting digital video signal parameters is for detecting an ICFO, a pilot pattern and a carrier mode of a signal received by an OFDM communication system. The method comprises receiving a first OFDM symbol comprising a plurality of first frequency-domain sub-carriers, and a second OFDM symbol comprising a plurality of second frequency-domain sub-carriers; generating a plurality of sub-carrier correlation results according to the plurality of first frequency-domain sub-carriers and the plurality of second frequency-domain sub-carriers; determining a maximum sub-carrier correlation result from the plurality of sub-carrier correlation results; and outputting an ICFO, an pilot pattern and a carrier mode corresponding to the maximum sub-carrier correlation result.

While the disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An apparatus for detecting a plurality of digital video signal parameters used in an Orthogonal Frequency-Division Multiplexing (OFDM) communication system, the apparatus receiving a first Orthogonal Frequency Division Multiplexing (OFDM) symbol and a second OFDM symbol to detect an integer carrier frequency offset (ICFO), a pilot pattern and a carrier mode of a received signal, the first OFDM symbol comprising a plurality of first frequency-domain sub-carriers, the second OFDM symbol comprising a plurality of second frequency-domain sub-carriers, the apparatus comprising:
a correlation apparatus that generates a plurality of sub-carrier correlation results according to a plurality of predetermined ICFOs, a predetermined pilot pattern, a predetermined carrier mode, and a plurality of correlation values generated from correlating the first frequency-domain sub-carriers and the second frequency-domain sub-carriers, the correlation apparatus comprising:
a correlator that complex-conjugate multiplies the plurality of first frequency-domain sub-carriers by the plurality of second frequency-domain sub-carriers to generate the plurality of correlation values;
a storage unit, coupled to the correlator, that stores the plurality of correlation values;
an address generating unit, coupled to the storage unit, that generates a plurality of sub-carrier addresses according to the plurality of predetermined ICFOs, the predetermined pilot pattern, and the predetermined carrier mode; and
an adding unit, coupled to the storage unit, that generates the sub-carrier correlation results from the absolute value of a summation of the plurality of correlation values corresponding to the plurality of sub-carrier addresses;
a maximum value searching unit, coupled to the correlation apparatus, that determines a maximum sub-carrier correlation result from the plurality of sub-carrier correlation results; and
a parameter generator, coupled to the maximum value searching unit, that generates the ICFOs, the pilot pattern and the carrier mode in response to the maximum sub-carrier correlation result.

2. The apparatus as claimed in claim 1, wherein the address generating unit comprises a shifter that generates the plurality of predetermined ICFOs.

3. The apparatus as claimed in claim 2, wherein the address generating unit further comprises a pilot pattern address generator, coupled to the shifter, that generates the predetermined pilot pattern.

4. The apparatus as claimed in claim 3, wherein the pilot pattern address generator selects the predetermined pilot pattern according to a Fast Fourier Transform (FFT) size and a guard interval.

5. The apparatus as claimed in claim 3, wherein the pilot pattern address generator selects the predetermined carrier mode according to a Fast Fourier Transform (FFT) size.

6. The apparatus as claimed in claim 1, wherein the OFDM communication system has a continual pilot pattern at a continual pilot address, and wherein each of the plurality of sub-carrier addresses is generated by adding the continual pilot address to each of the predetermined ICFOs.

7. The apparatus as claimed in claim 1, wherein the carrier mode comprises a normal carrier mode.

8. The apparatus as claimed in claim 7, wherein the carrier mode further comprises an extended carrier mode.

9. A method for detecting a plurality of digital video signal parameters, including an integer carrier frequency offset (ICFO), a pilot pattern and a carrier mode of a received signal in an Orthogonal Frequency Division Multiplexing (OFDM) communication system, the method comprising:
receiving a first OFDM symbol and a second OFDM symbol, the first OFDM symbol comprising a plurality of first frequency-domain sub-carriers, the second OFDM symbol comprising a plurality of second frequency-domain sub-carriers;
generating a plurality of sub-carrier correlation results according to a plurality of predetermined ICFOs, a predetermined pilot pattern, a predetermined carrier mode, and a plurality of correlation values generated from correlating the first frequency-domain sub-carriers and the second frequency-domain sub-carriers;
determining a maximum sub-carrier correlation result from the sub-carrier correlation results; and
outputting the ICFO, the pilot pattern, and the carrier mode in response to the maximum sub-carrier correlation result,
wherein each of the sub-carrier correlation results is an absolute value of a summation of the correlation values corresponding to the predetermined ICFO, the predetermined pilot pattern, and the predetermined carrier mode.

10. The method as claimed in claim 9, wherein each of the correlation values is a complex-conjugate product of each of the first frequency-domain sub-carriers by each of the second frequency-domain sub-carriers.

11. The method as claimed in claim 9, further comprising selecting the predetermined pilot pattern according to a Fast Fourier Transform (FFT) size and a guard interval.

12. The method as claimed in claim 9, further comprising selecting the predetermined carrier mode according to a Fast Fourier Transform (FFT) size.

13. The method as claimed in claim 9, wherein the carrier mode comprises a normal carrier mode and an extended carrier mode.

* * * * *